C. R. PARKER & R. D. WIRT.
AUTOMOBILE LOCK.
APPLICATION FILED MAY 13, 1910.
993,544.
Patented May 30, 1911.
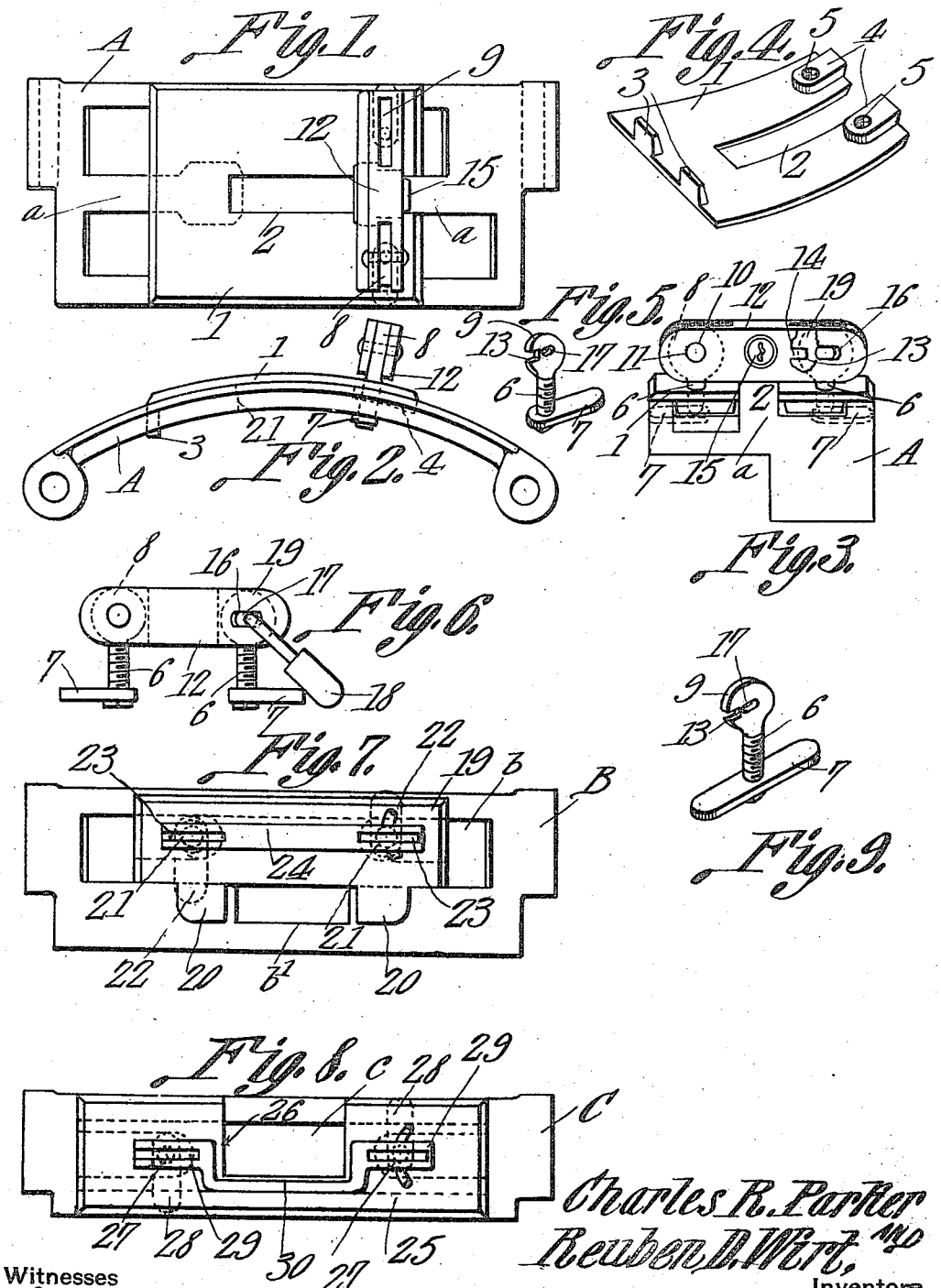
Witnesses
Charles R. Parker
Reuben D. Wirt,
Inventors
by
Attorneys

UNITED STATES PATENT OFFICE.

CHARLES R. PARKER AND REUBEN D. WIRT, OF PHILADELPHIA, PENNSYLVANIA, ASSIGNORS TO GENERAL UTILITY COMPANY, OF PHILADELPHIA, PENNSYLVANIA.

AUTOMOBILE-LOCK.

993,544.     Specification of Letters Patent.     Patented May 30, 1911.

Application filed May 13, 1910. Serial No. 561,202.

*To all whom it may concern:*

Be it known that we, CHARLES R. PARKER and REUBEN D. WIRT, citizens of the United States, residing at Philadelphia, in the county of Philadelphia, State of Pennsylvania, have invented a new and useful Automobile-Lock, of which the following is a specification.

This invention relates to automobile locks, its object being to provide a lock for holding the clutch lever against movement without preventing the actuation of the brake lever.

Locks such as heretofore devised have held both the clutch lever and the brake lever against movement. This has been undesirable because, when the machine has been left in a garage, it has been necessary to leave both levers unlocked, as otherwise it would be impossible to move the machine from place to place. As the clutch lever has thus been left free, it has been possible for unauthorized persons to use the machine.

A further object is to provide a lock which can be readily applied to different makes of automobiles and which is compact in construction, can be readily applied, and will securely hold the clutch lever without interference with the brake lever.

With these and other objects in view the invention consists of certain novel details of construction and combinations of parts hereinafter more fully described and pointed out in the claims.

In the accompanying drawings the preferred forms of the invention have been shown.

In said drawings:—Figure 1 is a plan view of the lock applied to one form of lever guide plate. Fig. 2 is a side elevation of the parts shown in Fig. 1. Fig. 3 is an end elevation thereof, a part of the link being broken away. Fig. 4 is a perspective view of the holding plate inverted. Fig. 5 is a perspective view of one of the buttons used in connection with the lock. Fig. 6 is an elevation of the buttons and their connecting link, a padlock being shown for the purpose of securing the parts in locking position. Fig. 7 is a view similar to Fig. 1 and showing a modified form of lock applied to another form of guide plate. Fig. 8 is a view similar to Fig. 7 and showing another form of lock applied to another form of guide plate. Fig. 9 is a view of a modified form of button.

Referring to the figures by characters of reference A designates the ordinary form of H-plate such as commonly employed as a guide for a clutch lever shiftable to three speeds and "reverse" position. When the clutch is in its inactive position the lever thereof rests between the tongues *a* extending longitudinally within the plate A. In order that the said lever may be secured in this position and thus prevented from moving so as to actuate the clutch, the lock constituting the present invention has been devised. This lock is in the form of a chock or filler adapted to be inserted in the guideway of the lever so as to prevent movement of said lever, and includes a holding plate or base 1 curved so as to conform with the contour of the plate A and the width of the plate is equal to or less than that of the guide plate so that the brake lever, which works in a plane close to one edge of the guide plate A, will not be obstructed. A central longitudinal slot 2 extends into the holding plate 1 from one end thereof and is adapted, when the plate is in position upon the guide A, to extend between the tongues *a* so that the holding plate 1 will thus straddle the clutch lever located between the tongues and prevent it from being displaced laterally. Retaining lugs 3 extend downwardly from one end of the plate 1 and at opposite sides of one of the tongues *a*, and enlargements 4 are formed on the bottom of the plate 1 at the other end thereof and extend to opposite sides of the other tongue *a*. It will be apparent therefore that these lugs and enlargements will hold the plate 1 against lateral movement relative to the guide A.

In order that the holding plate 1 may be secured to the guide A, threaded openings 5 are extended through the enlargements 4 and receive screws 6 each of which is provided at its lower end with a button or wing 7. Heads 8 and 9 are formed at the upper ends of the screws 6, one of these heads being formed with a central opening 10 in which is arranged a pivot pin 11 or the like having a link 12 fulcrumed thereon. Both ends of the link are forked, one of these ends straddling the head 8 while the other end is shiftable so as to receive the head 9 therein. A notch 13 is formed in the periphery of head 9 and is adapted to receive the bolt 14 of a lock 15 which is housed within the link 12. The heads 8 and 9 are so arranged that, when the buttons 7 are extended under opposite portions of the guide A said heads will aline and thus permit the link 12 to be placed in engagement with, and to be locked to the head 9. An opening 16 may be formed in the link, this opening being adapted to register with an opening 17 formed in the head 9, these two openings 16 and 17 being utilized to receive a padlock 18 should the lock 15 get out of order.

It is to be understood of course that lock 15 and bolt 14 can be entirely dispensed with if desired and a padlock employed as the sole locking means, as shown in Fig. 6.

When it is desired to lock the clutch lever by means of the structure which has been described, the screws 6 are turned so as to bring the wings and the heads thereof parallel with the slot. Holding plate 1 is then placed astride the clutch lever which is located between the tongues $a$, and the lugs 3 and enlargements 4 will therefore rest within the slot in the guide plate A at opposite sides of the tongues $a$. With the parts thus assembled, the screws 6 are turned so as to swing the wings or buttons 7 under opposite edge portions of the guide plate A and to bring the heads 8 and 9 into alinement. Link 12 is then swung downwardly into engagement with the head 9 and the bolt 14 shifted into the notch 13. Holding plate 1 will thus be securely locked to the guide plate A and will be held against lateral movement by the lugs 3 and enlargements 4, against longitudinal movement by the lever of the clutch mechanism, and against upward movement by the wings or buttons 7. As the plate 1 does not project beyond the guide plate A, it will not interfere with the actuation of the brake lever which is ordinarily located close to the guide plate A. It will be seen therefore that an automobile, while stored within a garage can be locked so that the clutch mechanism cannot be operated by unauthorized persons although the brake mechanism will be free and the machine can therefore be pushed from place to place.

In Fig. 7 the lock has been shown applied to another form of guide plate B wherein a single slot $b$ is provided, there being a central recess $b'$ at one side of the slot and in which the clutch lever is seated while the clutch is in its neutral position. In order that the lever may be locked in this recess, it becomes necessary to slightly modify the construction of the lock shown in Figs. 1 to 3 inclusive. In this modified form the base plate or holder 19 is provided with laterally extending lugs 20 adapted to bear upon the guide plate B with the recess $b'$ between them. Plate 19 extends longitudinally of the slot $b$ and has threaded stems 21 mounted in the end portions thereof, each stem having a button or ring 22 at its lower end and a head 23 at its upper end. A link 24 similar to the link 12 is pivotally connected to one of the heads and the buttons or wings 22 are so positioned relative to the heads that, when said heads are in alinement, the buttons are extended in opposite directions and under opposite walls of the slot $b$. With the parts thus located the link 24 can be locked in engagement with the head 23 which is separate therefrom and the clutch lever will thus be held within the recess $b'$ and cannot be shifted therefrom without first disengaging the link 24 and turning the two buttons out of engagement with the plate B. This plate 19 is of course provided with enlargements similar to those shown at 4 in Fig. 4 but the enlargements are located at the two ends of the plate where the screws 21 are located.

In Fig. 8 a guide plate C has been shown wherein a straight slot $c$ is formed. In order that the clutch lever may be locked at an intermediate point within this slot a holding plate or base such as shown at 25 may be utilized. This plate has a recess 26 in one side thereof and through which a portion of the slot $c$ is exposed, the recess constituting a seat for the clutch lever. Screws 27 are journaled in the end portions of the plate and have buttons 28 at their lower ends adapted to be swung into engagement with opposite walls of the slot $c$. Each of these screws has a head 29 at its upper end and a forked link 30 is pivotally connected to one of these heads and is adapted to be swung into engagement with the other head and to be locked thereto by means of a padlock or the like. The intermediate portion of the link is off-set so as to extend around the clutch lever seated within the recess 26. It is to be understood that the screws 27 extend through enlargements similar to the enlargements 4 and which are located at the ends of the plate 25, these enlargements being adapted to bear against the end walls of the slot $c$ and thus hold the plate 25 against longitudinal displacement.

It will be apparent that various other changes may be made in the construction and arrangement of the parts so as to adapt the lock for use in connection with other types of guide plates. In every instance, however, the plate is provided with the particular means described for holding it upon the guide and in no instance does the plate of the lock extend beyond the guide plate to a point where it would obstruct the movement of the brake lever.

While the lock has been described as especially designed for use in securing the clutch lever of an automobile against movement, it is to be understood that the same may be employed in connection with other levers if so desired.

What is claimed is:—

1. A lock including a lever engaging member, separate devices movably mounted upon said member, each of said devices including means at one end and revoluble into engagement with a lever guide, and a head at its other end, and means movably connected to one of the heads for engaging the other head to lock said devices in engagement with the lever guide.

2. A lock including a lever engaging member, spaced devices carried by said member and rotatable into engagement with a lever guide, means carried by one of said devices for engaging the other device and locking the devices in engagement with the lever guide, and means upon said member for holding it against sliding movement relative to the guide.

3. A lock including a lever engaging member, spaced revoluble means insertible through a lever guide for locking said member in engagement with the guide, and means carried by one of said revoluble means and shiftable into engagement with the other one of said means for locking said means in engaging position.

4. A lock including a lever engaging member, devices adjustably and revolubly mounted upon said member, each of said devices including means revoluble into engagement with a lever guide and a head, a link movably connected to one of the heads, and means for locking the link to the other head.

5. A lock including a member adapted to straddle a lever, separate lever guide engaging buttons carried by and movable relative to said member, a pivoted device movable with, and adapted to swing relative to one of the buttons, and means movable with the other button for engagement by said device to hold the two buttons against relative movement.

6. A lock including a member shiftable transversely of and into engagement with a lever, revoluble spaced means movably mounted upon said member for projecting into the slot within, and engaging the walls of the slot in a lever guide, and a fastening means for securing said engaging means against rotation relative to each other and to the member.

7. The combination with a lever guide having a slot, and a lever movably mounted within the guide, of a member shiftable transversely of the lever into engagement with said lever, spaced revoluble devices carried by said member and insertible into the lever guide, said devices being revoluble to engage a wall of the guide, and means for locking said devices against rotation while engaging the slot wall.

8. The combination with a lever and a lever guide having a slot, of a lock including a member shiftable transversely of and into engagement with the lever, engaging devices revoluble upon said member and insertible into the slot in the guide, said devices being revoluble to engage the lower face of the guide, and means pivotally connected to one of said devices, and movable into engagement with the other device to hold said devices against rotation while in engaging positions.

9. In mechanism of the class described, the combination of a suitable framework or standard, an operating lever slidable with reference thereto, a plate adapted to engage said lever and hold it against movement, a pair of shafts pivotally mounted upon said plate, locking levers upon said shafts adapted to enter recesses in the framework and be moved to a position in which they prevent removal of the plate from the framework, and means for padlocking said shafts in said last mentioned position.

10. In mechanism of the class described, the combination of a framework or standard, an operating lever slidable with reference thereto, a locking member adapted to inclose said lever and be supported upon the framework, a pair of shafts upon said locking member having locking devices adapted to enter recesses in the framework and be turned to a position where they lock the plate member upon the standard and levers upon other portions of said shafts so arranged that when said locking devices lock the plate upon the standard they are in proximity to each other, and a padlock adapted to enter holes in said last mentioned lever for the purpose of securing said levers in locking position, for the purposes set forth.

11. In mechanism of the class described, in combination with a suitable standard and a lever movable with reference thereto, a plate adapted to be applied to said standard so that a slot or notch in the plate incloses the lever and prevents its movement with reference to the standard, a pair of shafts carrying locking devices adapted to enter recesses within the standard and be turned to a position where they engage the standard, a pair of levers upon said shafts capable of being turned for the purpose of operating said locking devices, as described, and a lock adapted to engage said levers, all arranged and disposed as shown and described for the purposes set forth.

12. In combination with an engine lever and a standard having two parallel elongated slots in which the lever may selectively travel and a cross passage way connecting said slots, a plate adapted to cover the slots in the standard except for an open ended slot registering with the cross passage way within which the lever may rest, a pair of shafts journaled in said plate, one entering each of said elongated slots, and carrying on its entering end a locking member adapted to lockingly engage the standard, and levers upon other portions of said shafts adapted to be locked together when the plate is locked on the standard as described.

In testimony that we claim the foregoing as our own, we have hereto affixed our signatures in the presence of two witnesses.

CHARLES R. PARKER.
REUBEN D. WIRT.

Witnesses:
ANSON B. EVANS,
SAMUEL N. CARPENTER.

Copies of this patent may be obtained for five cents each, by addressing the "Commissioner of Patents, Washington, D. C."